Feb. 15, 1927.
C. W. KUCHER
ANCHOR
Filed Nov. 4, 1926
1,617,528
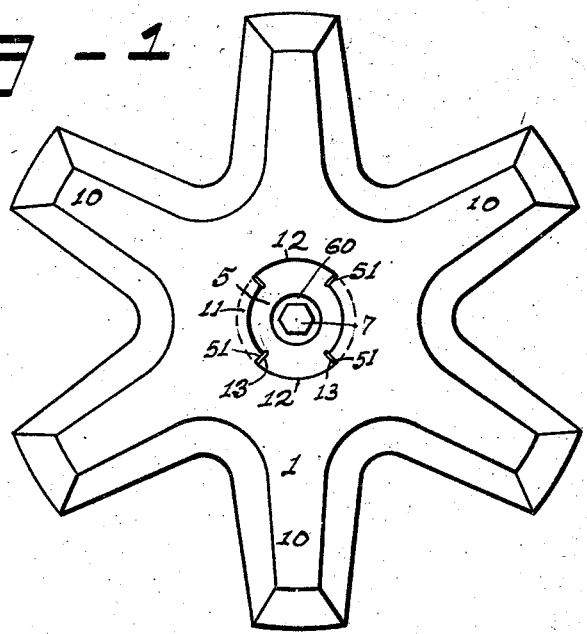
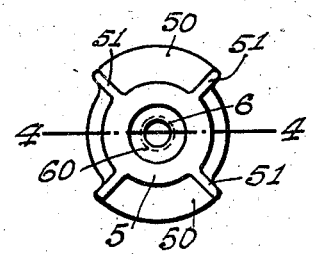
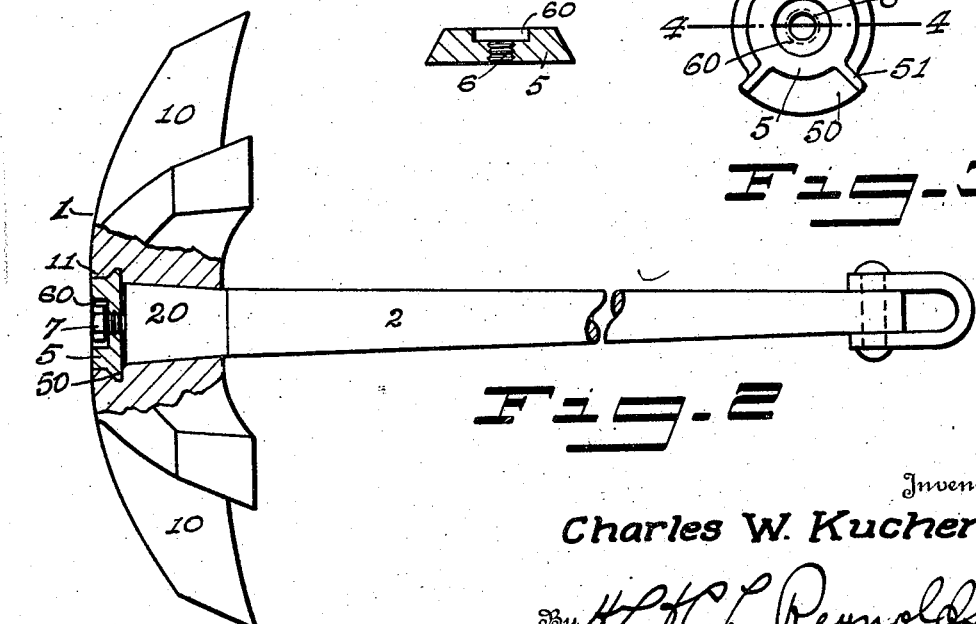
Inventor
Charles W. Kucher
By H.L. & C.L. Reynolds
Attorneys Patented Feb. 15, 1927.

1,617,528

UNITED STATES PATENT OFFICE.

CHARLES W. KUCHER, OF SEATTLE, WASHINGTON.

ANCHOR.

Application filed November 4, 1926. Serial No. 146,121.

My invention relates to anchors and particularly to anchors having shank and head separable for facility of shipping.

The object of my invention is to produce an improved design of anchor of this type. My invention consists in the features of construction which will hereinafter be described and then particularly defined by the claims.

The accompanying drawings illustrate my construction of anchor.

Figure 1 is a view showing the outer or lower face of the anchor head.

Figure 2 is a side view of the anchor with a portion of the head broken away to show the manner of securing together the head and shank.

Figure 3 is a view of the outer face of the shank locking plate or disk.

Figure 4 is a section of said locking plate on the line 4—4 of Figure 3.

The anchor to which my invention applies is that which is generically called mushroom anchors. It comprises a head 1 having a series of arms or flukes 10 and a shank 2. The particular shape of the head is immaterial to my invention, as this is confined to the method and means employed to secure together the head and shank.

The shank has its end section 20, by which it is secured to the head, coned, and the head is similarly bored to make a close fit therewith. The head also has a recess surrounding the bore upon its outer face, said recess being somewhat larger than the largest part of the bore. Segments 11, of the walls of this recess, project inwardly or towards the central axis, forming overhanging flanges. These are, however, far enough from the central axis to not interfere with the insertion of the shank.

A locking plate, or washer, 5, shown in detail in Figures 3 and 4, is inserted in this recess, after the shank has been put in place, to thereby prevent removal of the shank.

The two segments 12 of the side wall of the recess in the head are straight sided, that is, segments, of a cylinder having a common axis with the shank. The two segments 11 are, however, undercut.

The plate or disk 5 is of such diameter through the segments 50 that these may be entered in the recess in the head, if placed coincident with the segment 12. When so placed, it is turned until the segments 50 are under the overhanging flanges 11 of the head. If now the plate be secured in this position, it is obvious that the shank cannot be removed.

The means employed by me to do this is as follows. The plate has a central hole 6 threaded to receive a short bolt 7 and a recess 60 in the plate receives the head. The plate also has slight ribs 51 at each end of the segments 50 which, when the plate is forced outward by screwing down the bolt, will engage the shoulders 13 to prevent turning of the plate.

The above construction does not weaken the shank by the cutting of a key seat therein and also avoids any protuberance at the outer face of the head. It is therefore stronger and more convenient to handle, as well as requiring less freight, due to occupying less space.

What I claim as my invention is:

1. An anchor comprising a head, a shank, said head having a coned shank receiving bore and the shank a complementally coned base end, the head having an enlarged recess surrounding said bore at the outer face of the head, and a locking member adapted to be secured in said recess to prevent removal of the shank.

2. An anchor comprising a head having a shank receiving bore, and a recess surrounding said bore at its outer face, a shank seating in said bore with its end below said recess, and a locking plate securable in said recess to prevent removal of the shank.

3. An anchor as in claim 2, having segments of the peripheral wall of said recess undercut and the locking plate having complementally beveled edge sections.

4. The combination with an anchor as in claim 3, of a securing bolt threaded through the locking plate and engaging the end face of the shank.

5. An anchor comprising a head having a shank receiving bore and a recess in its outer face surrounding said bore, the walls of said recess having inwardly projecting segments, a locking plate having edge segments shaped complementally to said projecting segments of the recess wall, and also having face projections at the ends of said segments, and a bolt threaded through said plate and engaging the end face of the shank.

Signed at Seattle, King County, Washington, this 29th day of October, 1926.

CHARLES W. KUCHER.